(12) United States Patent
Li et al.

(10) Patent No.: US 10,091,724 B2
(45) Date of Patent: Oct. 2, 2018

(54) INFORMATION TRANSMISSION METHOD AND DEVICE

(71) Applicant: China Mobile Communications Corporation, Beijing (CN)

(72) Inventors: Nan Li, Beijing (CN); Qun Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 352 days.

(21) Appl. No.: 14/889,807

(22) PCT Filed: May 8, 2014

(86) PCT No.: PCT/CN2014/076996
§ 371 (c)(1),
(2) Date: Jan. 11, 2016

(87) PCT Pub. No.: WO2014/180315
PCT Pub. Date: Nov. 13, 2014

(65) Prior Publication Data
US 2016/0142976 A1 May 19, 2016

(30) Foreign Application Priority Data

May 8, 2013 (CN) .......................... 2013 1 0167392

(51) Int. Cl.
*H04W 52/02* (2009.01)
*H04W 8/22* (2009.01)
(Continued)

(52) U.S. Cl.
CPC ......... *H04W 52/0216* (2013.01); *H04W 8/22* (2013.01); *H04W 52/367* (2013.01);
(Continued)

(58) Field of Classification Search
None
See application file for complete search history.

(56) References Cited

U.S. PATENT DOCUMENTS 8,798,663 B2 * 8/2014 Wang ................. H04W 52/367
455/515
2008/0037413 A1 2/2008 Gu et al.
(Continued)

FOREIGN PATENT DOCUMENTS

CN 1764081 A 4/2006
CN 101091326 A 12/2007
(Continued)

OTHER PUBLICATIONS

Chinese Office Action, dated Mar. 31, 2017, for Chinese Patent Application No. 201310167392.6 (with English-language translation).
(Continued)

*Primary Examiner* — Christopher Grey
(74) *Attorney, Agent, or Firm* — Morgan Lewis & Bockius LLP (57) ABSTRACT

The present disclosure provides an information transmission method and an information transmission device. The information transmission method includes a step of transmitting, by a network-side device, at least one of information about a power back-off value, information about a resource allocation mode and DRX configuration information to a UE in accordance with information about a type or a capability level of a PA reported by the UE.

20 Claims, 7 Drawing Sheets

(51) Int. Cl.
  *H04W 72/08* (2009.01)
  *H04W 52/52* (2009.01)
  *H04W 76/28* (2018.01)
  *H04W 52/14* (2009.01)
  *H04W 52/36* (2009.01)
  *H04W 52/44* (2009.01)

(52) U.S. Cl.
  CPC ......... *H04W 52/52* (2013.01); *H04W 72/087* (2013.01); *H04W 76/28* (2018.02); *H04W 52/146* (2013.01); *H04W 52/36* (2013.01); *H04W 52/44* (2013.01); *Y02D 70/00* (2018.01); *Y02D 70/24* (2018.01)

(56) References Cited

U.S. PATENT DOCUMENTS

| | | | | |
|---|---|---|---|---|
| 2008/0101268 | A1* | 5/2008 | Sammour | H04W 76/048 370/311 |
| 2008/0130589 | A1* | 6/2008 | Gorokhov | H04L 5/0007 370/336 |
| 2008/0207143 | A1 | 8/2008 | Skarby et al. | |
| 2010/0142455 | A1* | 6/2010 | Imamura | H04W 52/146 370/329 |
| 2012/0113915 | A1* | 5/2012 | Chen | H04W 52/365 370/329 |

FOREIGN PATENT DOCUMENTS

| | | |
|---|---|---|
| CN | 102239733 A | 11/2011 |
| CN | 102448157 A | 5/2012 |
| EP | 2 437 554 A1 | 4/2012 |
| EP | 2437554 A1 | 4/2012 |
| JP | 2010-503360 A | 1/2010 |
| JP | 2012-023770 A | 2/2012 |
| JP | 2012-511266 A | 5/2012 |
| WO | WO 2008/052195 A2 | 5/2008 |
| WO | WO 2011/019653 A1 | 2/2011 |
| WO | WO 2012/044102 A2 | 4/2012 |
| WO | WO 2013/054294 A1 | 4/2013 |

OTHER PUBLICATIONS

European Search Report, dated Nov. 3, 2016, for European Patent Application No. 14795037.2.

International Search Report and Written Opinion, dated Aug. 8, 2014, for International Application No. PCT/CN2014/076996, filed May 8, 2014 (with English-language translation).

Japanese Office Action, dated Oct. 28, 2016, for Japanese Patent Application No. 2016-512214 (with English-language translation).

European Office Action dated Nov. 23, 2017, for EP Application No. 14795037.2 10 pages.

\* cited by examiner

```
RF-Parameters ::=            SEQUENCE {
    supportedBandList            SupportedBandList
    PowerAmplifierType ::= ENUMERATED {a, b, c, d, e, f, ...}
}
```

Fig. 5A

```
SupportedBandList ::=                SEQUENCE {
    PowerAmplifierType ::= ENUMERATED {a, b, c, d, e, f, ...}
    OPTIONAL
}
```

Fig. 5B

```
RF-Parameters-v1130 ::=              SEQUENCE {
    supportedBandCombination-v1130
    SupportedBandCombination-v1130
    PowerAmplifierType ::= ENUMERATED {a, b, c, d, e, f, ...}
    OPTIONAL
}
```

Fig. 5C

```
BandCombinationParameters-v1130 ::= SEQUENCE {
    multipleTimingAdvance-r11    ENUMERATED {supported}          OPTIONAL,
    simultaneousRx-Tx-r11        ENUMERATED {supported}          OPTIONAL,
    PowerAmplifierType ::= ENUMERATED {a, b, c, d, e, f, ...}
bandParameterList-r11        SEQUENCE   (SIZE   (1..maxSimultaneousBands-r10))    OF
BandParameters-v1130 OPTIONAL
```

INFORMATION TRANSMISSION METHOD AND DEVICE

CROSS-REFERENCE TO RELATED APPLICATION

This application is the U.S. national phase of PCT Application No. PCT/CN2014/076996 filed on May 8, 2014, which claims a priority of the Chinese Patent Application No. 201310167392.6 filed on May 8, 2013, the disclosures of which are incorporated in their entirety by reference herein.

TECHNICAL FIELD

The present disclosure relates to the field of communication technology, in particular to an information transmission method and an information transmission device.

BACKGROUND

Power amplifier (PA) is one of the most important modules for a communication system, and along with the development of the radio communication technology, the performance of the power amplifier is more demanding than ever before.

Figure 1:
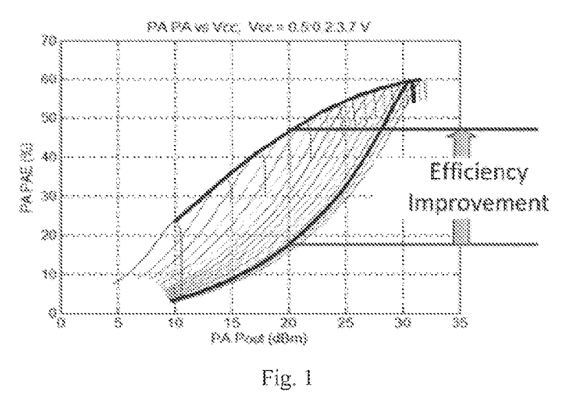
FIG. 1 is a schematic view showing the efficiency improvement made by an existing HEPA.

Currently, the introduction of a high efficiency PA (HEPA) into a user equipment (UE) is being discussed by the $3^{rd}$ Generation Partnership Project (3GPP) Radio Access Network 4 (RAN4), so as to reduce the power consumption and improve the heat dissipation, thereby to improve the user experience. Especially, this scheme appeals to smart phones, and FIG. 1 shows the efficiency improvement made by the HEPA.

Figure 2:
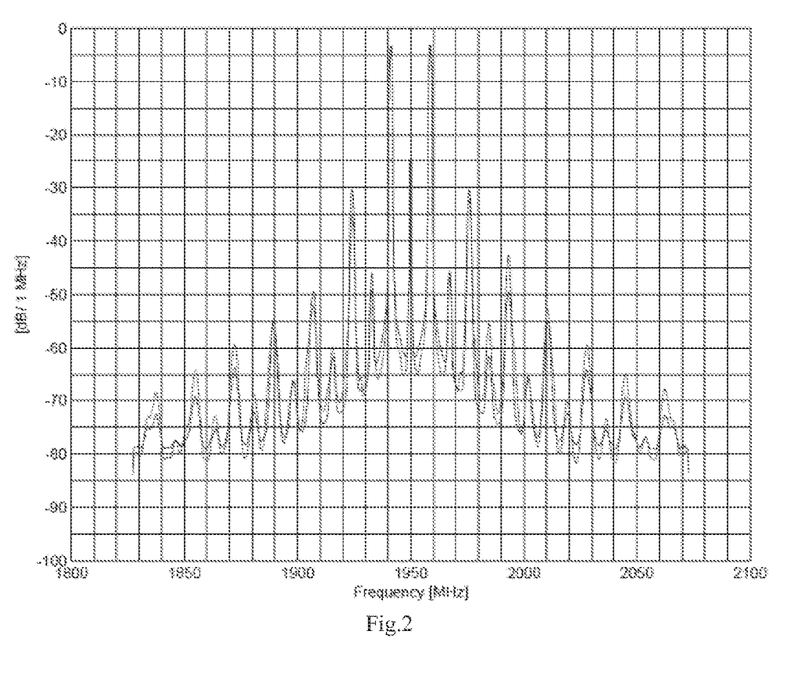
FIGS. 2 and 3 are schematic views showing spectral radiation characteristics of the existing HEPA.
Figure 3:
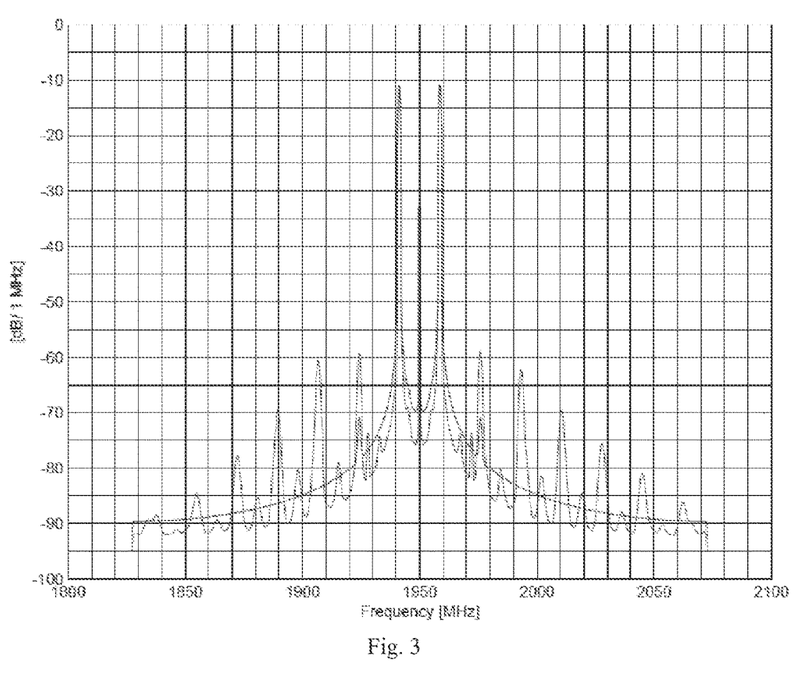

One primary problem for the HEPA lies in its bad linearity, with a direct form of worse out-of-band radiation than a low efficiency PA. Especially, larger adjacent channel interference (ACI) may occur in a multi-cluster transmission mode and at low power, as shown in FIGS. 2 and 3.

In the related art, an adjacent channel protection index belongs to a management requirement and the requirement on an out-of-band interference index shall not be relaxed even when an advance technique is adopted by an interferer. Hence, the only feasible method is to adopt a larger in-band power back-off so as to meet the same requirement on the out-of-band interference index, i.e., to reduce actual transmission power of the UE. However, this will bring challenges to uplink network coverage for operators and increase the cost for networking. In addition, when the HEPA is used in a frequency division duplex (FDD) mode, the out-of-band linearity of the UE will be deteriorated. When the had duplex isolation exists between an uplink and a downlink of the UE, the sensitivity of a receiver of the UE may be weakened, and downlink network coverage may be adversely affected. Hence, when the HEPA is introduced, it is required to set an additional radio frequency (RF) index (there already exists a RF index corresponding to the low efficiency PA), and at this time, there will be two RF indices for the HEPA and the low efficiency PA. However, in current UE capabilities signaling, RF capabilities information merely include information about a supported Band List, without any relevant information about a type of the PA or a PA capability level, so it is impossible for the operator to determine the type or capability level of the PA integrated into the UE. At this time, probably the actual efficiency of the PA will not be improved, and meanwhile the RF index will be relaxed and the network coverage cost for the operator will increase.

In addition, in a resource-partial-allocation mode, a difference between the power back-off values for the HEPA and the low efficiency PA may be about 10 dB. When a network-side device does not know the type and capability level of the PA and determines a corresponding power back-off value, a scheduling error may probably occur.

SUMMARY

An object of the present disclosure is to provide an information transmission method and an information transmission device, so as to enable a UE to report a type or a capability level of a PA to a network-side device.

In one aspect, the present disclosure provides in one embodiment an information transmission method, including a step of transmitting, by a network-side device, at least one of information about a power back-off value, information about a resource allocation mode and discontinuous reception (DRX) configuration information to a UE in accordance with information about a type or a capability level of a PA reported by the UE.

In another aspect, the present disclosure provides in one embodiment an information transmission method, including a step of reporting, by a UE, information about a type or a capability level of a PA of the UE to a network-side device.

In yet another aspect, the present disclosure provides in one embodiment a network-side device, including a transmission module configured to transmit at least one of information about a power back-off value, information about a resource allocation mode and DRX configuration information to a UE in accordance with information about a type or a capability level of a PA reported by the UE.

In still yet another aspect, the present disclosure provides a UE, including a transmission module configured to report information about a type or a capability level of a PA of the UE to a network-side device.

According to the embodiments of the present disclosure, the network-side device determines at least one of the information about the power back-off value, the information about the resource allocation mode and the DRX configuration information to be transmitted to the UE in accordance with the information about the type or capability level of the PA reported by the UE. As a result, it is able for the network-side device to transmit at least one of the information about the power back-off value, the information about the resource allocation mode and the DRX configuration information to the UE in a more appropriate manner.

DETAILED DESCRIPTION

In order to overcome the above drawbacks in the related art, the present disclosure provides herein a novel information transmission scheme, in which a network-side device determines at least one of information about a power back-off value, information about a resource allocation mode and DRX configuration information to be transmitted to a UE in accordance with information about a type or a capability level of a PA.

In the embodiments of the present disclosure, signaling for reporting UE capability information in an existing standard protocol, i.e., UE-EUTRA-Capability, may be extended, and an information element (IE) carrying the information about the type or capability level of the PA of the UE may be added in a field RF-Parameters. In this way, the UE may report the type or capability level of the PA to the network-side device, so that the network-side device may transmit at least one of the information about the power back-off value, the information about the resource allocation mode and the DRX configuration information in a more appropriate manner.

It should be appreciated that, the above-mentioned way of reporting, by the UE, the type or capability level of the PA to the network-side device by extending the signaling UE-EUTRA-Capability is for illustrative purposes only, but shall not be used to limit the scope of the present disclosure. In fact, some other ways may also be used. For example, new signaling may be defined in the protocol, or the other existing signaling may be extended, so as to enable the UE to report the type or capability level of the PA to the network-side device.

The present disclosure will be described hereinafter in a clear and complete manner in conjunction with the drawings and embodiments. Obviously, the following embodiments are merely a part of, rather than all of the embodiments of the present disclosure, and based on these embodiments, a person skilled in the art may, without any creative effort, obtain the other embodiments which also fall within the scope of the present disclosure.

Figure 4:
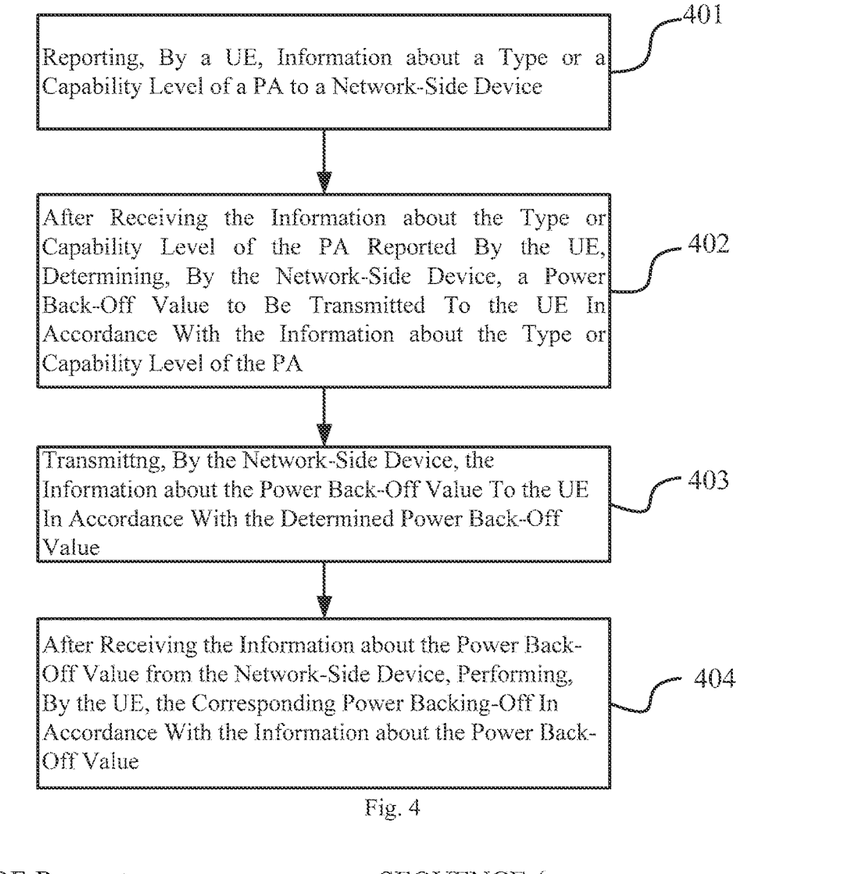
FIG. 4 is a flow chart of an information transmission method according to one embodiment of the present disclosure.

As shown in FIG. 4, which is a flow chart of an information transmission method according to one embodiment of the present disclosure, the information transmission method may include Steps 401 to 404.

Step 401: reporting, by a UE, information about a type or a capability level of a PA to a network-side device. In this embodiment, a new IE carrying the information about the type or capability level of the PA, e.g., PowerAmplifierType, may be defined in the field RF-Parameters of the signaling UE-EUTRA-Capability in the existing standard protocol.

Figure 5A:
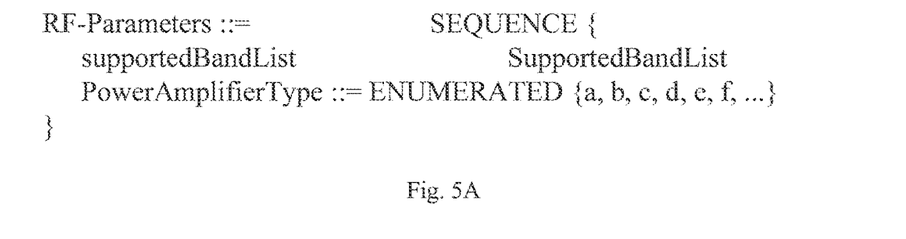
FIGS. 5A-5D are schematic views showing newly-added information elements (IEs) according to one embodiment of the present disclosure.

When the PAs of an identical type or capability level are adopted by the UE at all the supported frequency bands, the UE is required to report the type or capability level of the PAs to the network-side device. At this time, the newly-defined IE merely include the type or capability level of the PAs, as shown in FIG. 5A.

Figure 5B:
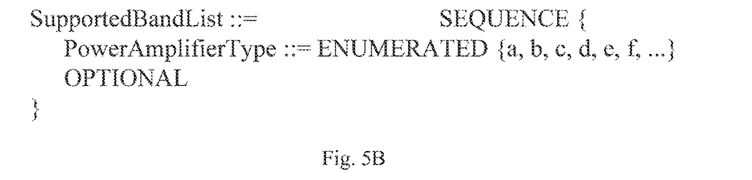

When the PAs of different types or capability levels are adopted by the UE at all the supported frequency bands (i.e., the PAs of different types or capability levels are adopted by the UE at at least two frequency bands), the UE is required to report the types or capability levels of the PAs to the network-side device at the supported frequency bands (i.e., the types or capability levels of the PAs corresponding to the supported frequency bands, respectively, e.g., type a of the PA corresponds to frequency band 1, and type b of the PA corresponds to frequency band 2). At this time, the newly-defined IE needs to include the types of the PAs corresponding to the supported frequency bands, as shown in FIG. 5B.

Figure 5C:
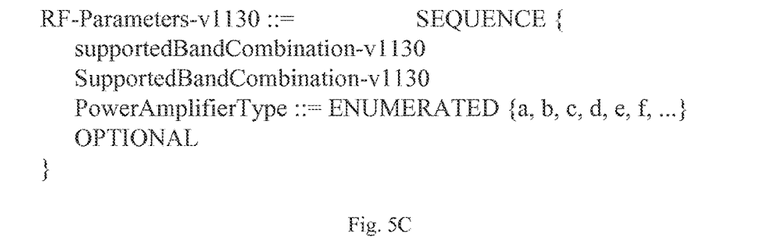

When UE supports carrier aggregation and the PAs of an identical type are adopted by the UE at all the supported frequency band combinations for the carrier aggregation, the UE is required to report the type or capability level of the PAs to the network-side device. At this time, the newly-defined IE merely needs to include the type or capability of the PAs, as shown in FIG. 5C.

Figure 5D:
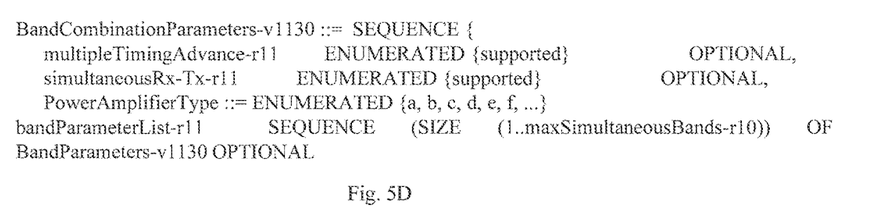

When the UE supports carrier aggregation and the PAs of different types or capability levels are adopted by the UE at all the supported frequency band combinations for the carrier aggregation (i.e., the PAs of different types or capability levels are adopted by the UE at at least two of the supported frequency band combinations for the carrier aggregation), the UE is required to report the types or capability levels of the PAs to the network-side device at the supported carrier-aggregation frequency band combinations (i.e., the types or capability levels of the PAs corresponding to the supported carrier-aggregation frequency band combinations, respectively, e.g., type a of the PA corresponds to carrier-aggregation frequency band combination 1, and type b of the PA corresponds to carrier-aggregation frequency band combination 2). At this time, the newly-defined IE needs to include the types or capability levels of the PAs corresponding to all the supported carrier-aggregation frequency band combinations as shown in FIG. 5D.

Step 402: after receiving the information about the type or capability level of the PA reported by the UE, determining, by the network-side device, a power back-off value to be transmitted to the UE in accordance with the information about the type or capability level of the PA.

In this embodiment, after the network-side device receives the information about the type or capability level of the PA reported by the UE, it may determine, in accordance with this information, a power back-off value desired for the UE to meet the out-of-band radiation requirement in available uplink resource allocation modes (i.e., a: a transmission mode, including such as a single carrier single cluster mode, a single carrier multiple cluster mode or a multiple carrier multiple cluster mode; b: a size of a resource block; and c: a position of the resource block). Then, the network-side device may determine whether or not the available resource allocation modes may meet the service transmission requirement of the UE in accordance with the power back-off value, select, from the available resource allocation modes, a source allocation mode that may meet the service transmission requirement of the UE, and determine this resource allocation mode and the power back-off value desired for the UE to meet the out-of-hand radiation requirement (e.g., spectrum emission mask (SEM), adjacent channel leakage rate (ACLR) and suprious emission (SE)) in this resource allocation mode as the resource allocation mode and the corresponding power back-off value to be transmitted to the UE, respectively. During this procedure, the network-side device may also determine an uplink resource allocation mode to be transmitted to the UE.

In this embodiment, the information about the type or capability level of the PA received by the network-side device from the UE may include the information about the type or capability level of the PA corresponding to the supported frequency band, or the information about the type or capability level of the PA corresponding to the supported carrier-aggregation frequency band combination.

Correspondingly, the following ways may be used by the network-side device, so as to determine the power back-off value desired for the UE to meet the out-of-band radiation requirement in the available uplink resource allocation modes in accordance with the information about the type or capability level of the PA reported by the UE. After receiving the information about the type or capability level of the PA reported by the UE, the network-side device may perform simulation evaluation in real time in accordance with the type or capability level of the PA reported by the UE, a transmission bandwidth of the UE, and an out-of-band radiation index corresponding to the supported frequency band or carrier-aggregation frequency band combination, and then determine the power back-off value desired for the UE to meet the out-of-band radiation requirement in each of the available uplink resource allocation modes. Alternatively, after receiving the information about the type or capability level of the PA reported by the UE, the network-side device may look up a mapping table stored therein in accordance with the type or capability level of the PA reported by the UE, the transmission bandwidth of the UE, and the out-of-band radiation index corresponding to the supported frequency band or carrier-aggregation frequency band combination, and then determine the power back-off value desired for the UE to meet the out-of-band radiation requirement in each of the available resource allocation modes. Correspondences among the types of the PAs, the transmission bandwidths, the out-of-band radiation indices corresponding to the supported frequency bands or carrier-aggregation frequency band combinations and the power back-off values are recorded in the mapping able. This mapping table may be obtained through simulation estimation by the network-side device or a third-party device in advance, and stored in the network-side device.

Further, the network-side device may determine, in accordance with the power back-off value, whether each of the available uplink resource allocation modes meets the service transmission requirement of the UE at least in the following three ways.

In a first way, the network-side device may determine whether or not the available resource allocation modes meet the service transmission requirement of the UE in accordance with the power back-off value desired for the UE to meet the out-of-band radiation requirement and channel quality information reported by the UE in the available uplink resource allocation modes.

In a second way, the network-side device may determine whether or not the available resource allocation modes meet the service transmission requirement of the UE in accordance with the power back-off value desired for the UE to meet the out-of-band radiation requirement and uplink signal received power of the UE in the available uplink resource allocation modes.

For example, assuming that the network-side device plans to allocate 20 continuous single-carrier resource blocks for the UE at a 16 Quadrature Amplitude Modulation (16 QAM) ¾ mode and at a target signal-to-noise ratio (SNR) of 10 dB, and the power back-off value desired for the UE to meet the out-of-band radiation requirement in a certain uplink resource allocation mode determined by the network-side device is 8 dB, then the network-side device may determine whether or not the desired SNR is met in accordance with the SNR (e.g., 12 dB) reported by the UE at a previous scheduling moment after the power backing-off, so as to determine whether or not the uplink resource allocation mode meets the service transmission requirement of the UE.

In this example, after the power backing-off, the SNR of the UE is 4 dB (12 dB–8 dB, provided that uplink interference power at the previous scheduling moment is the same as that at a current scheduling moment), which is less than the target SNR (10 dB), so this uplink resource allocation mode does not meet the service transmission requirement of the UE.

In a third way, the network-side device may determine whether or not the available uplink resource modes meet the service transmission requirement of the UE in accordance with the power back-off value desired for the UE to meet the out-of-bond radiation requirement and power headroom reported by the UE (i.e., a difference between current transmission power and maximum transmission power of the UE) in the determined available uplink resource allocation modes.

For example, assuming that the power headroom reported by the UE at the previous scheduling moment is 3 dB (e.g., the current transmission power of the UE is 20 dBm and the maximum transmission power is 23 dBm), the network-side device may calculate an interference value in accordance with a size of the resource block scheduled by the UE and the desired SNR for the modulation mode at the previous scheduling moment as well as the transmission power of the UE, and calculate the desired transmission power (e.g., 19 dB) in accordance with a size of the resource block planned to be scheduled currently to the UE and the modulation mode. Assuming that the network-side device determines that the power back-off value desired for the UE to meet the out-of-band requirement in a certain uplink resource allocation mode is 7 dB, then the maximum transmission power that may be supported by the UE currently is 16 dBm (23 dBm–7 dB). Hence, the network-side device may determine that his uplink resource allocation mode cannot meet the service transmission requirement of the UE.

Step 403: transmitting, by the network-side device, the information about the power back-off value to the UE in accordance with the determined power back-off value.

In this embodiment, the network-side device may indicate to the UE the amount for the power backing-off (i.e., the power back-off value) by transmitting the information about the power back-off value to the UE. In the information about the power back-off value, all the supported frequency bands or carrier-aggregation frequency band combinations may be of an identical power back-off value, or different power back-off values.

In addition, in the information about the power back-off value, different ranges and the corresponding power back-off values may be set with respect to the transmission bandwidths of the UE, the sizes of the occupied resource blocks, the positions of the resource blocks and whether or not the resource blocks are continuous. Alternatively, the network-side device may also transmit the determined uplink resource allocation mode to the UE, so that the UE may transmit data in accordance with the uplink resource allocation mode.

Step 404: after receiving the information about the power back-off value from the network-side device, performing, by the UE, the corresponding power backing-off in accordance with the information about the power back-off value.

In this embodiment, after the UE receives the information about the power back-off value from the network-side device, it may perform the power backing-off in accordance with the information about the power back-off value. When it also receives the uplink resource allocation mode from the network-side device, the UE may further transmit data in accordance with the uplink resource allocation mode.

Further, in this embodiment, after the UE receives the information about the power back-off value from the network-side device, it may determine the transmission power headroom of the UE in accordance with the received information about the power back-off value, and the information about the size of the occupied resource blocks as well as the modulation and encoding mode at the previous scheduling moment, and then report the power headroom to the network-side device.

When the maximum physical transmission power of the UE is Pmax, the power back-off value corresponding to the received information about the power back-off value is MPR and the desired transmission power after the power control is Ptrans, the power headroom may be calculated as follows: Power Headroom=Pmax−MPR−Ptrans.

In addition, in the embodiment of the present disclosure, after the network-side device receives the type of the PA reported by the UE, it may test the type of the PA using special instrument (the instrument may perform a test in accordance with the capability information corresponding to the type of the PA reported by the UE), so as to determine an actual type of the PA.

After receiving signaling about the type of the PA reported by the UE, the network-side device may identify the corresponding type of the PA in accordance with the signaling, indicate the instrument to select a corresponding test case and indices corresponding to the type of PA, and then test the UE, so as to determine whether or not the type of the PA reported by the UE is true.

Figure 6:
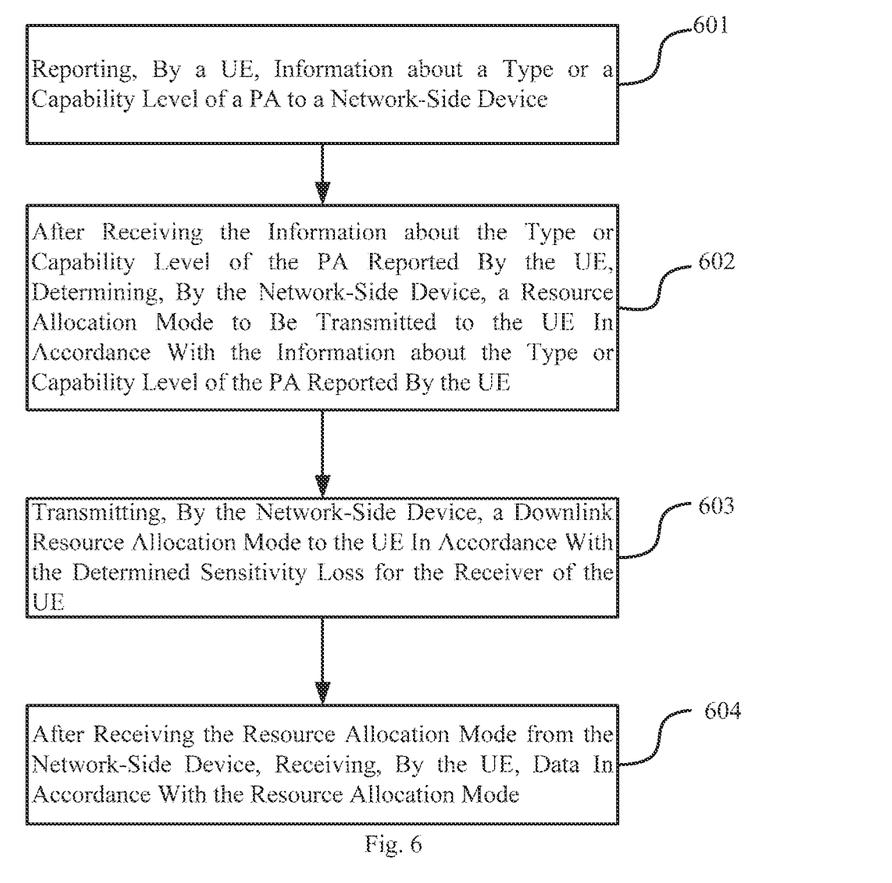
FIG. 6 is a flow chart of another information transmission method according to one embodiment of the present disclosure.

As shown in FIG. 6, which is a flow chart of another information transmission method according to one embodiment of the present disclosure, the information transmission method may include Steps 601 to 604.

Step 601: reporting, by a UE, information about a type or a capability level of a PA of the UE to a network-side device. The specific operation in this embodiment may refer to that mentioned in Step 401.

Step 602: after receiving the information about the type or capability level of the PA reported by the UE, determining, by the network-side device, a resource allocation mode to be transmitted to the UE in accordance with the information about the type or capability level of the PA reported by the UE.

In this embodiment, after the network-side device receives the information about the type or capability level of the PA reported by the UE, it may determine a sensitivity loss for a receiver of the UE (i.e., a reduced amount of the sensitivity of the receiver of the UE) in accordance with the information about the type or capability level of the PA reported by the UE as well as an uplink resource allocation mode (i.e., a: a transmission mode, including such as a single carrier single duster mode, a single carrier multiple cluster mode or a multiple carrier multiple cluster mode; b: a size of a resource block; and c: a position of the resource block).

For example, assuming that the network-side device allocates 20 continuous single-carrier resource blocks for the UE at a 16 QAM ¾ mode, and these resource blocks are transmitted from the leftmost side of a 20 MHz transmission bandwidth, the network-side device may, in accordance with the uplink resource allocation mode, determine the sensitivity loss within a received frequency range caused after an HEPA is adopted. To be specific, the network-side device may establish a model in accordance with the out-of-band characteristics corresponding to different types or capability levels of the PAs, and then perform simulation evaluation on the sensitivity losses for the receiver in different uplink resource allocation modes.

For example, when at frequency bands of 1710-1785 MHz and 1805-1880 MHz, a transmission bandwidth of the UE at the uplink frequency band 1710-1785 MHz is 20 MHz, i.e., from 1765-1785 MHz, and when the continuous uplink resource blocks each having a size of 50 RB are allocated by the network-side device for the UE and transmitted at 1775-1785 MHz, the network-side device may perform the simulation evaluation in accordance with the RF characteristics of the HEPA and the resource allocation mode, so as to obtain the sensitivity loss, e.g., 3 dB, for the receiver of the UE in the uplink resource allocation mode (at a downlink frequency band 1805-1880 MHz).

The procedures for determining by the network-side device the uplink resource allocation mode to be transmitted to the UE may refer to those mentioned in Steps 402-404.

Step 603: transmitting, by the network-side device, a downlink resource allocation mode to the UE in accordance with the determined sensitivity loss for the receiver of the UE.

In this embodiment, the network-side device may determine whether or not the service transmission requirement is met by the UE in a target downlink resource allocation mode in accordance with the determined sensitivity loss, e.g., 3 dB, for the receiver of the UE.

Step 604: after receiving the resource allocation mode from the network-side device, receiving, by the UE, data in accordance with the resource allocation mode.

Figure 7:
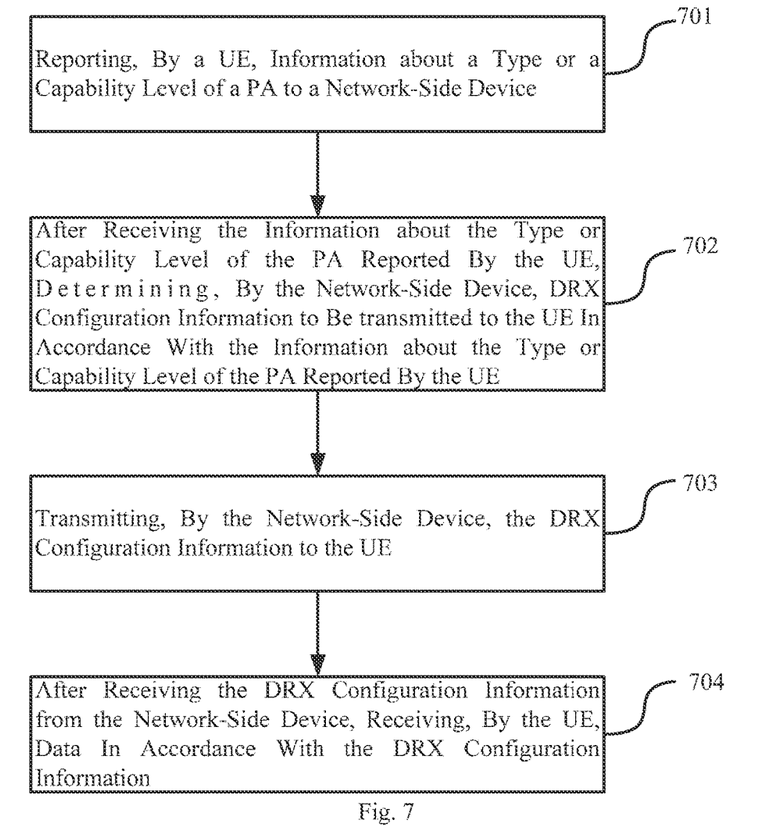
FIG. 7 is a flow chart of yet another information transmission method according to one embodiment of the present disclosure.

As shown in FIG. 7, which is a flow chart of yet another information transmission method according to one embodiment of the present disclosure, the information transmission method may include Steps 701 to 704.

Step 701: reporting, by a UE, information about a type or a capability level of a PA of the UE to a network-side device. The specific operation in this embodiment may refer to Step 401.

Step 702: after receiving the information about the type or capability level of the PA reported by the UE, determining, by the network-side device, DRX configuration information to be transmitted to the UE in accordance with the information about the type or capability level of the PA reported by the UE.

In this embodiment, after the network-side device receives the information about the type or capability level of the PA reported by the UE, it may determine a sensitivity level of the UE to power overhead in accordance with the information about the type or capability level of the PA reported by the UE. For example, the network-side device may determine that the sensitivity level of the UE to the power overhead is lower when a HEPA is adopted, and that the sensitivity level of the UE to the power overhead is higher when a low efficiency PA is adopted. Hence, the network-side device may configure DRX parameters for the UE by taking the requirement of the UE on a frequency interval for receiving the service and the sensitivity level of the UE to the power overhead into consideration. For example, when the UE is not sensitive to the power consumption, with respect to the same requirement of the UE on the frequency interval for receiving the service, at least one of a shorter DRX period and a longer wakeup reception duration may be configured for the UE with the HEPA, and at least one of a longer DRX period and a shorter wakeup reception duration may be configured for the UE with the low efficiency PA.

Step 703: transmitting, by the network-side device, the DRX configuration information to the UE.

Step 704: after receiving the DRX configuration information from the network-side device, receiving, by the UE, data in accordance with the DRX configuration information.

According to the above-mentioned embodiments, the UE may report the information about the type or capability level of the PA to the network-side device, and the network-side device may transmit at least one of the information about the power back-off value, the information about the resource allocation mode and the DRX configuration information to the UE in accordance with the information about the type or capability level of the PA. As a result, it is able for the network-side device to transmit the power back-off value, the resource allocation mode and the DRX parameters in a more appropriate manner.

Based on an identical inventive concept, the present disclosure provides in one embodiment a network-side device for the above-mentioned information transmission methods.

Figure 8:
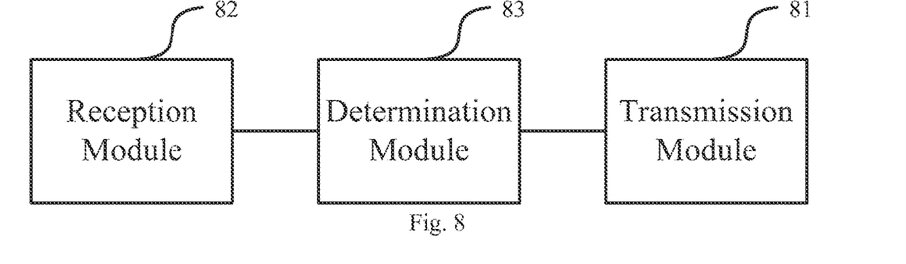
FIG. 8 is a schematic view showing a network-side device according to one embodiment of the present disclosure.

As shown in FIG. 8, which is a schematic view showing the network-side device according to one embodiment of the present disclosure, the network-side device may include a transmission module 81 configured to transmit at least one of information about a power back-off value, information about a resource allocation mode and DRX configuration information to a UE in accordance with information about a type or a capability level of a PA reported by the UE.

In addition, the network-side device may further include a reception module 82 configured to receive the information about the type or capability level of the PA reported by the UE.

Apart from the above, the network-side device may further include at least one of a first determination module configured to determine information about a power back-off value to be transmitted to the UE in accordance with the information about the type or capability level of the PA reported by the UE, a second determination module configured to determine information about a resource allocation mode to be transmitted to the UE in accordance with the information about the type or capability level of the PA reported by the UE, and a third determination module configured to determine DRX configuration information to be transmitted to the UE in accordance with the information about the type or capability level of the PA reported by the UE.

The first determination module, the second determination module and the third determination module may be arranged separately, or formed integrally as a single module. In the embodiment of the present disclosure, they are formed integrally as the determination module 83.

In the embodiment of the present disclosure, the first determination module may be configured to determine the power back-off value to be transmitted to the UE in the following way. The first determination module may determine a power back-off value desired for the UE to meet an out-of-hand radiation requirement in available uplink resource allocation modes in accordance with the information about the type or capability level of the PA, determine whether or not the available uplink resource allocation modes meet a service transmission requirement of the UE in accordance with the power back-off value, select an uplink resource allocation mode from the available uplink resource allocation modes that meet the service transmission requirement, and then determine the power back-off value desired for the UE to meet the out-of-band radiation requirement in the selected uplink resource allocation mode as the power back-off value to be transmitted to the UE.

In the embodiment of the present disclosure, the second determination module may be configured to determine the resource allocation mode to be transmitted to the UE in the following way. The second determination module may determine a power back-off value desired for the UE to meet the out-of-band radiation requirement in the available uplink resource allocation modes in accordance with the information about the type or capability level of the PA, determine whether or not the available uplink resource allocation modes meet a service transmission requirement of the UE in accordance with the power back-off value, select an uplink resource allocation mode from the available uplink resource allocation modes that meet the service transmission requirement, and then determine the uplink resource allocation mode as the resource allocation mode to be transmitted to the UE.

In the embodiment of the present disclosure, the second determination module may be further configured to determine a sensitivity loss for a receiver of the UE in accordance with the type or capability level of the PA and the determined uplink resource allocation mode to be transmitted to the UE, determine whether or not available downlink resource allocation modes meet the service transmission requirement of the UE in accordance with the sensitivity loss for the receiver, select a downlink resource allocation mode from the available downlink resource allocation modes that meet the service transmission requirement, and determine the downlink resource allocation mode as the resource allocation mode to be transmitted to the UE.

In the embodiment of the present disclosure, the third determination module may be configured to determine the DRX configuration information to be transmitted to the UE in the following way. The third determination module may determine a sensitivity level of the UE to power overhead in accordance with the type or capability level of the PA reported by the UE, and configure the DRX parameters for the UE in accordance with the sensitivity level of the UE to the power overhead and a requirement of the UE on a frequency interval for receiving the service.

The information about the type or capability level of the PA reported by the UE may include information about the type or capability level of the PA corresponding to a supported frequency band, or information about the type or capability level of the PA corresponding to a supported carrier-aggregation frequency band combination.

In this case, the first determination module is configured to determine, in the following ways, the power back-off value desired for the UE to meet the out-of-band radiation requirement in the available uplink resource allocation modes in accordance with the information about the type or capability level of the PA reported by the UE. The first determination module may perform simulation evaluation in accordance with the information about the type or capability level of the PA reported by the UE, a transmission bandwidth of the UE, a size of a resource block, a starting position of the resource block, a transmission mode of the resource block and an out-of-band radiation index corresponding to the supported frequency band or carrier-aggregation frequency band combination, and determine the power back-off value desired for the UE to meet the out-of-band radiation requirement in each of the available uplink resource allocation modes. Alternatively, the first determination module may look up a mapping table stored therein in accordance with the information about the type or capability level of the PA reported by the UE, the transmission bandwidth of the UE, the size of the resource block, the starting position of the resource block, the transmission mode of the resource block and the out-of-band radiation index corresponding to the supported frequency band or carrier-aggregation frequency band combination, and determine the power back-off value desired for the UE to meet the out-of-band radiation requirement in each of the available uplink resource allocation modes. Correspondences among information about the types or capability levels of the PAs, the transmission bandwidths, the out-of-band radiation indices corresponding to the supported frequency bands or carrier-aggregation frequency band combinations and the power back-off values are recorded in the mapping table. This mapping table may be obtained through simulation estimation by the network-side device or a third-party device in advance, and stored in the network-side device.

The first determination module is configured to determine, in the following ways, whether or not the available uplink resource allocation modes meet the service transmission requirement of the UE in accordance with the power back-off value. The first determination module may determine whether or not the available resource allocation modes meet the service transmission requirement of the UE in accordance with the power back-off value and channel quality information reported by the UE, or in accordance with the power back-off value and uplink signal received power of the UE, or in accordance with the power back-off value and power headroom reported by the UE.

The present disclosure further provides in one embodiment a UE for the above-mentioned methods.

Figure 9:
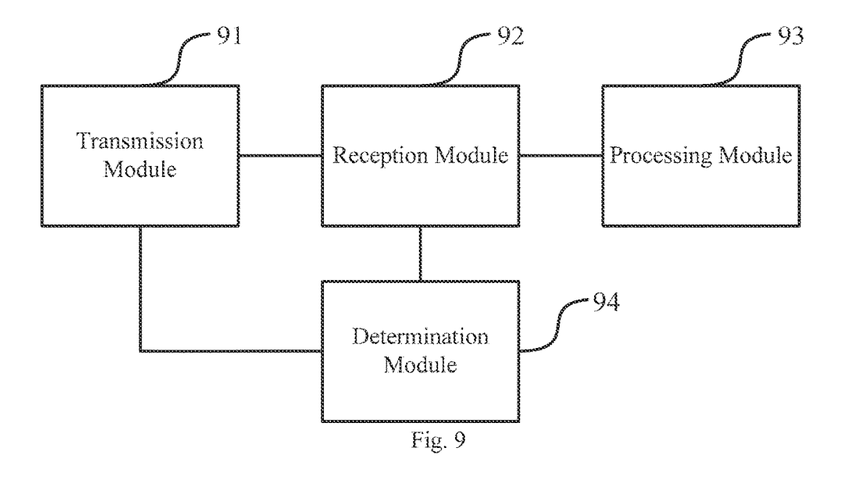
FIG. 9 is a schematic view showing a UE according to one embodiment of the present disclosure.

As shown in FIG. 9, which is a schematic view showing the UE according to one embodiment of the present disclosure, the UE may include a transmission module 91 configured to report information about a type or capability level of a PA to a network-side device.

In the embodiment of the present disclosure, the transmission module 91 is specifically configured to, when the PAs adopted by the UE at all the supported frequency bands are of an identical type or capability level, report the information about the type or capability level of the PAs to the network-side device; when the PAs adopted by the UE at all the supported frequency bands are of different types or capability levels, report the information about the types or capability levels of the PAs corresponding to the supported frequency bands to the network-side device; when the UE supports carrier aggregation and the PAs corresponding to all the supported carrier-aggregation frequency band combinations are of an identical type or capability level, report the information about the type or capability level of the PAs to the network-side device; and when the UE supports the carrier aggregation and the PAs corresponding to all the supported carrier-aggregation frequency band combinations are of different types or capability levels, report the information about the types or capability levels of the PAs corresponding to the supported carrier-aggregation frequency band combinations to the network-side device.

In the embodiment of the present disclosure, the UE may further include a first reception module configured to receive information about a power back-off value from the network-side device after the information about the type or capability level of the PA is reported by the transmission module to the network-side device, and a first processing module configured to perform the power backing-off in accordance with the information about the power back-off value.

In the embodiment of the present disclosure, the UE may further include a second reception module configured to receive information about a resource allocation mode from the network-side device after the information about the type or capability level of the PA is reported by the transmission module to the network-side device, and a second processing module configured to transmit data in accordance with the information about the resource allocation mode.

In the embodiment of the present disclosure, the UE may further include a third reception module configured to receive DRX configuration information from the network-side device after the information about the type or capability level of the PA is reported by the transmission module to the network-side device, and a third processing module configured to perform the power backing-off in accordance with the DRX configuration information.

The first reception module, the second reception module and the third reception module may be arranged separately, or formed integrally as a single module. In the embodiment of the present disclosure, they are formed integrally as the reception module 92. Correspondingly, the first processing module, the second processing module and the third processing module are formed integrally as the processing module 93.

In the embodiment of the present disclosure, the UE may further include a determination module 94 configured to, after the information about the power back-off value is received by the first reception module from the network-side device, determine transmission power headroom of the UE in accordance with the information about the power back-off value, and information about a size of an occupied resource block as well as a modulation and encoding mode at a previous scheduling moment. In this case, the transmission module 91 is configured to report the transmission power headroom to the network-side device.

In the embodiment of the present disclosure, the determination module 94 is configured to determine the transmission power headroom of the UE in accordance with the information about the power back-off value, and the information about the size of the occupied resource block as well as the modulation and encoding mode at the previous scheduling moment using the following equation: Power Headroom=Pmax−MPR−Ptrans. Ptrans represents the desired transmission power of the UE after the power control, Pmax represents the maximum physical transmission power of the UE, and MPR represents the power back-off value corresponding to the information about the power back-off value.

Through the above description, it may be apparent to a person skilled in the art that the present invention may be implemented by hardware, or by software as well as a necessary common hardware platform. Based on this understanding, the technical solutions of the present disclosure may appear in the form of software products, which may be stored in a non-volatile storage medium (CD-ROM, USB flash disk or mobile HDD) and include several instructions so as to enable a computer equipment (personal computer, server or network equipment) to execute the methods according to the embodiments of the present disclosure.

It should be appreciated that the drawings merely relate to the preferred embodiments, and the modules or flows in the drawings are not always those necessary for the implementation of the present disclosure.

It should be further appreciated that the modules may be arranged in the device in the above-mentioned embodiments or, after some changes, in one or more devices different from that according to the embodiments of the present disclosure. The modules may be combined into one module, or may be further divided into a plurality of submodules.

The above are merely the preferred embodiments of the present disclosure. Obviously, a person skilled in the art may make further modifications and improvements without departing from the principle of the present disclosure, and these modifications and improvements shall also fall within the scope of the present disclosure.

What is claimed is:

1. An information transmission method, comprising a step of:
   receiving, by a network-side device, information about a type or a capability level of a power amplifier (PA) reported by a user equipment (UE);
   transmitting, by the network-side device, at least one of information about a power back-off value, information about a resource allocation mode or discontinuous reception (DRX) configuration information to the UE in accordance with the information about the type or the capability level of the PA reported by the UE,
   wherein the method further comprises, subsequent to receiving, by the network-side device, the information about the type or capability level of the PA reported by the UE, a step of:
   determining, by the network-side device, the information about the power back-off value to be transmitted to the UE in accordance with the information about the type or capability level of the PA reported by the UE,
   wherein the step of determining, by the network-side device, the information about the power back-off value to be transmitted to the UE in accordance with the information about the type or capability level of the PA comprises:
      determining, by the network-side device, a power back-off value desired for the UE to meet an out-of-band radiation requirement in each of available uplink resource allocation modes in accordance with the information about the type or capability level of the PA reported by the UE, wherein the out-of-band radiation requirement comprises spectrum emission mask, adjacent channel leakage rate and suprious emission.

2. The information transmission method according to claim 1, further comprising, subsequent to receiving, by the network-side device, the information about the type or capability level of the PA reported by the UE, a step of:
   determining, by the network-side device, the information about the resource allocation mode to be transmitted to the UE in accordance with the information about the type or capability level of the PA reported by the UE.

3. The information transmission method according to claim 1, further comprising, subsequent to the step of receiving, by the network-side device, the information about the type or capability level of the PA reported by the UE, a step of:
   determining, by the network-side device, the DRX configuration information to be transmitted to the UE in accordance with the information about the type or capability level of the PA reported by the UE.

4. The information transmission method according to claim 1, wherein the step of determining, by the network-side device, the information about the power back-off value to be transmitted to the UE further comprises:
   determining, by the network-side device, whether or not each of the available uplink resource allocation modes meets a service transmission requirement of the UE in accordance with the power back-off value; and
   selecting, by the network-side device, an uplink source allocation mode from the available resource allocation modes that meet the service transmission requirement of the UE, and determining the power back-off value desired for the UE to meet the out-of-band requirement in the uplink resource allocation mode as the power back-off value to be transmitted to the UE.

5. The information transmission method according to claim 2, wherein the step of determining, by the network-side device, the resource allocation mode to be transmitted to the UE comprises:
   determining, by the network-side device, a power back-off value desired for the UE to meet the out-of-band requirement in each of available uplink resource allocation modes in accordance with the information about the type or capability level of the PA reported by the UE;
   determining, by the network-side device, whether or not each of the available uplink resource allocation modes meets the service transmission requirement of the UE in accordance with the power back-off value; and
   selecting, by the network-side device, an uplink resource allocation mode from the available uplink resource allocation modes that meet the service transmission requirement of the UE, and determining the uplink resource allocation mode as the resource allocation mode to be transmitted to the UE.

6. The information transmission method according to claim 5, further comprising steps of:
   determining, by the network-side device, a sensitivity loss for a receiver of the UE in accordance with the type or capability level of the PA and the determined uplink resource allocation mode to be transmitted to the UE;
   determining whether or not each of available downlink resource allocation modes meets the service transmission requirement of the UE in accordance with the sensitivity loss for the receiver of the UE; and
   selecting, by the network-side device, a downlink resource allocation mode from the available downlink resource allocation modes that meet the service transmission requirement of the UE, and determining the downlink resource allocation mode as the resource allocation mode to be transmitted to the UE.

7. The information transmission method according to claim 3, wherein the step of determining, by the network-side device, the DRX configuration information to be transmitted to the UE comprises:
   determining, by the network-side device, a sensitivity level of the UE to power overhead in accordance with the information about the type or capability level of the PA reported by the UE; and
   configuring, by the network-side device, the DRX configuration information for the UE in accordance with the sensitivity level of the UE to the power overhead and a requirement of the UE on a frequency interval for receiving the service.

8. The information transmission method according to claim 4, wherein the information about the type or capability level of the PA reported by the UE comprises information about the type or capability level of the PA corresponding to a supported frequency band, or information about the type or capability level of the PA corresponding to a supported carrier-aggregation frequency band combination;
   the step of determining, by the network-side device, the power back-off value desired for the UE to meet the out-of-band radiation requirement in each of the available uplink resource allocation modes in accordance with the information about the type or capability level of the PA reported by the UE comprises:

performing simulation evaluation in accordance with the information about the type or capability level of the PA reported by the UE, a transmission bandwidth of the UE, a size of an occupied resource block, a starting position of the resource block, a transmission mode of the resource block, and an out-of-band radaition index corresponding to the supported frequency band or carrier aggregation frequency band combination, and determining the power back-off value desired for the UE to meet the out-of-band radiation requirement in each of the available uplink resource allocation modes, or looking up, by the network-side device, a mapping table stored in the network-side device in accordance with the the information about the type or capability level of the PA reported by the UE, the transmission bandwidth of the UE, the size of the occupied resource block, the starting position of the resource block, the transmission mode of the resource block, and the out-of-band radiation index corresponding to the supported frequency band or carrier-aggregation frequency band combination, and determining the power back-off value desired for the UE to meet the out-of-band radiation requirement in each of the available uplink resource allocation modes, wherein correspondences among the information about the type or capability level of the PA, the transmission bandwidths, the out-of-band radiation indices corresponding to the supported frequency bands or carrier-aggregation frequency band combinations and the power back-off values are recorded in the mapping table, and the mapping table is obtained through simulation estimation by the network-side device or a third-party device in advance, and stored in the network-side device.

9. The information transmission method according to claim 4, wherein the step of determining, by the network-side device, whether or not the available uplink resource allocation modes meet the service transmission requirement of the UE in accordance with the power back-off value comprises:

determining, by the network-side device, whether or not the available resource allocation modes meet the service transmission requirement of the UE in accordance with the power back-off value and channel quality information reported by the UE; or determining, by the network-side device, whether or not the available resource allocation modes meet the service transmission requirement of the UE in accordance with the power back-off value and uplink signal received power of the UE; or determining, by the network-side device, whether or not the available resource allocation modes meet the service transmission requirement of the UE in accordance with the power back-off value and power headroom reported by the UE.

10. An information transmission method, comprising: a step of reporting, by a user equipment (UE), information about a type or capability level of a power amplifier (PA) to a network-side device, in such a manner that a network-side device receives the information about the type or capability level of the power amplifier reported by the UE, determines and transmits the information about a power back-off value, information about a resource allocation mode or discontinuous reception (DRX) configuration information in accordance with the information about the type or capability level of the PA, wherein the the step of determining, by the network-side device, the information about the power back-off value in accordance with the information about the type or capability level of the PA comprises:

determining, by the network-side device, a power back-off value desired for the UE to meet an out-of-band radiation requirement in each of available uplink resource allocation modes in accordance with the information about the type or capability level of the PA reported by the UE, wherein the out-of-band radiation requirement comprises spectrum emission mask, adjacent channel leakage rate and suprious emission.

11. The information transmission method according to claim 10, wherein the step of reporting, by the UE, the information about the type or capability level of the PA to the network-side device comprises:

when the PAs adopted by the UE at all supported frequency bands are of an identical type or capability level, reporting, by the UE, the information about the type or capability level of the PAs to the network-side device;

when the PAs adopted by the UE at all the supported frequency bands are of different types or capability levels, reporting, by the UE, the information about the types or capability levels of the PAs corresponding to the supported frequency bands to the network-side device;

when the UE supports carrier aggregation and the PAs corresponding to all supported carrier-aggregation frequency band combinations are of an identical type or capability level, reporting, by the UE, the information about the type or capability level of the PAs to the network-side device; and when the UE supports the carrier aggregation and the PAs corresponding to all the supported carrier-aggregation frequency band combinations are of different types or capability levels, reporting, by the UE, the information about the types or capability levels corresponding to the supported carrier-aggregation frequency band combinations to the network-side device.

12. The information transmission method according to claim 10, further comprising steps of:

receiving, by the UE, the information about a power back-off value from the network-side device, and performing power backing-off in accordance with the information about the power back-off value.

13. The information transmission method according to claim 10, further comprising step of:

receiving, by the UE, the information about the resource allocation mode from the network-side device, and transmitting data in accordance with the information about the resource allocation mode.

14. The information transmission method according to claim 10, further comprising steps of:

receiving, by the UE, the DRX configuration information from the network-side device, and receiving data in accordance with the DRX configuration information.

15. The information transmission method according to claim 12, further comprising, subsequent to receiving, by the UE, the information about the power back-off value from the network-side device, steps of:

determining, by the UE, transmission power headroom of the UE in accordance with the information about the power back-off value, and information about a size of an occupied resource block as well as a modulation and encoding mode at a previous scheduling moment, and reporting the transmission power headroom to the network-side device.

16. The information transmission method according to claim 15, wherein the transmission power headroom is determined by the UE in accordance with the information about the power back-off value, and the information about the size of the occupied resource block as well as the modulation and encoding mode at the previous scheduling moment using the following equation:

Power Headroom=Pmax−MPR−Ptrans, wherein Ptrans represents transmission power desired for the UE after power control, Pmax represents maximum physical transmission power of the UE, and MPR represents the power back-off value corresponding to the information about the power back-off value.

17. A network-side device, comprising: a processor and a memory stored with processor-executable programs, wherein when the programs are executed by the processor, the processor is configured to:
receive information about a type or a capability level of a power amplifier (PA) reported by a user equipment (UE);
transmit at least one of information about a power back-off value, information about a resource allocation mode or discontinuous reception (DRX) configuration information to the UE in accordance with information about the type or the capability level of the PA reported by the UE,
wherein subsequent to receiving, by the network-side device, the information about the type or capability level of the PA reported by the UE, the processor is further configured to:
determine the information about the power back-off value to be transmitted to the UE in accordance with the information about the type or capability level of the PA reported by the UE,
wherein the processor is further configured to:
determine a power back-off value desired for the UE to meet an out-of-band radiation requirement in each of available uplink resource allocation modes in accordance with the information about the type or capability level of the PA reported by the UE, wherein the out-of-band radiation requirement comprises spectrum emission mask, adjacent channel leakage rate and suprious emission.

18. A user equipment (UE), comprising: a processor and a memory stored with processor-executable programs, wherein when the programs are executed by the processor, the processor is configured to:
report information about a type or capability level of a power amplifier (PA) to a network-side device, in such a manner that a network-side device receives the information about the type or capability level of the power amplifier reported by the UE, determines and transmits the information about a power back-off value, information about a resource allocation mode or discontinuous reception (DRX) configuration information in accordance with the information about the type or capability level of the PA,
wherein the the step of determining, by the network-side device, the information about the power back-off value in accordance with the information about the type or capability level of the PA comprises:
determining, by the network-side device, a power back-off value desired for the UE to meet an out-of-band radiation requirement in each of available uplink resource allocation modes in accordance with the information about the type or capability level of the PA reported by the UE, wherein the out-of-band radiation requirement comprises spectrum emission mask, adjacent channel leakage rate and suprious emission.

19. The information transmission method according to claim 1, subsequent to receiving the type of the PA reported by the UE, further comprising:
testing, by network-side device, the type of the PA by using a special testing instrument to determine whether the type of the PA reported by the UE is identical to an actual type of the PA.

20. The information transmission method according to claim 7, wherein the determining, by the network-side device, the sensitivity loss for the receiver of the UE in accordance with the type or capability level of the PA and the determined uplink resource allocation mode to be transmitted to the UE:
performing a simulation evaluation in accordance with radio frequency characteristics of the PA and the resource allocation mode to obtain the sensitivity loss for the receiver of the UE in the uplink resource allocation mode.

* * * * *

UNITED STATES PATENT AND TRADEMARK OFFICE
CERTIFICATE OF CORRECTION

PATENT NO.         : 10,091,724 B2
APPLICATION NO.    : 14/889807
DATED              : October 2, 2018
INVENTOR(S)        : Nan Li et al.

It is certified that error appears in the above-identified patent and that said Letters Patent is hereby corrected as shown below:

On the Title Page

Item (73) reads:
"Assignee: China Academy of Telecommunications Technology, Beijing (CN)"
Should be corrected to read:
--Assignee: China Mobile Communications Corporation, Beijing (CN)--

Signed and Sealed this
Third Day of September, 2019

Andrei Iancu
*Director of the United States Patent and Trademark Office*